Figure 1:
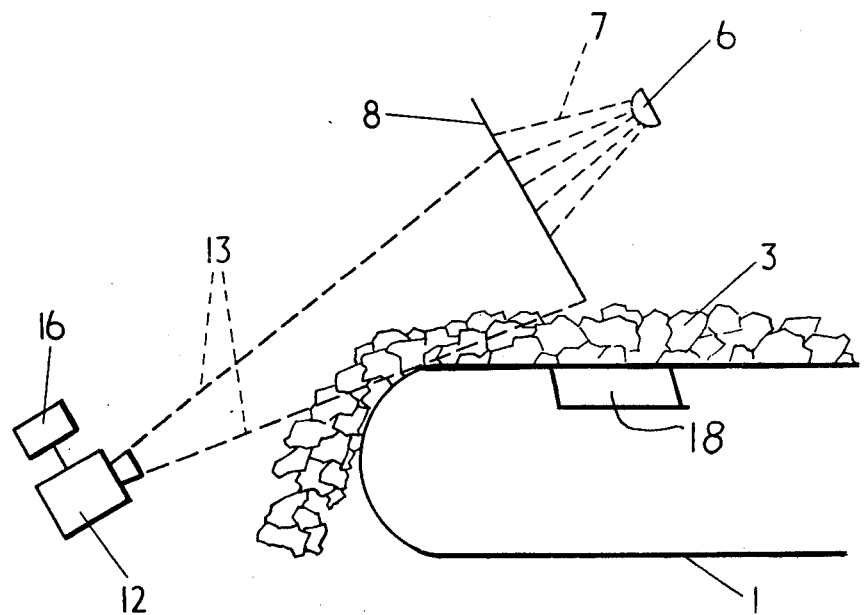

United States Patent

Crosland et al.

[11] 4,035,635
[45] July 12, 1977

[54] METHOD OF AND APPARATUS FOR MEASUREMENT OF FLOW OF PARTICULATE MATERIAL BY SENSING THE SHADOW PROFILE

[75] Inventors: Roy Crosland, Rolleston-on-Dove; Andrew Howard Donaldson Park, Burton-on-Trent, both of England

[73] Assignee: Coal Industry (Patents) Limited, London, England

[21] Appl. No.: 665,761

[22] Filed: Mar. 11, 1976

[30] Foreign Application Priority Data

Mar. 14, 1975 United Kingdom ............ 10714/75

[51] Int. Cl.² .................. H01J 39/12; G01N 21/26
[52] U.S. Cl. ............................ 250/223 R; 250/577
[58] Field of Search ............ 250/223 R, 577, 578, 250/576, 574, 560, 222 PC; 350/113; 356/209, 210, 110

[56] References Cited

U.S. PATENT DOCUMENTS

| | | | |
|---|---|---|---|
| 3,566,135 | 2/1971 | Mouchart | 250/223 |
| 3,834,819 | 9/1974 | Montone | 250/222 R |
| 3,890,221 | 6/1975 | Muehlethaler | 250/222 R |

*Primary Examiner*—Alfred E. Smith
*Assistant Examiner*—David K. Moore
*Attorney, Agent, or Firm*—James C. Wray

[57] ABSTRACT

A beam of light is directed at a flow of particulate material discharging from a conveyor in a curved path. The lower part of the light beam is interrupted by the material as it follows the curved path, the shadow profile being sensed to give an indication of the volume of material flowing.

10 Claims, 2 Drawing Figures

METHOD OF AND APPARATUS FOR MEASUREMENT OF FLOW OF PARTICULATE MATERIAL BY SENSING THE SHADOW PROFILE

The present invention relates to a method of and apparatus for measurement of flow of particulate material.

In particular, although not exlusively, the present invention relates to measurement of the volume of particulate material on a conveyor.

According to one aspect of the present invention a method of measuring flow of particulate material comprises abruptly changing the direction of flow of material, directing a beam of light towards the material currently changing its direction of flow so that a portion of the beam light is interrupted by the material currently changing direction of flow, sensing the shadow profile of the material interrupting the beams of light, deriving a signal indicative of the shadow profile, and monitoring the derived signal to determine the volume of flow.

Conveniently, the material changes its direction of flow as it is discharged from a conveyor.

According to another aspect of the present invention apparatus for carrying out the above method for measuring flow of particulate material comprises a light beam source for directing a light beam towards the flow of particulate material as it abruptly changes direction such that in use a portion of the light beam is interrupted by the flow of material, a sensor for sensing the shadow profile formed by the material currently interrupting the light beam and for deriving a signal indicative of the shadow profile, and a monitor for receiving the derived signal to determine the volume of flow.

Preferably, a transluscent screen is provided between the source and the particulate material.

Figure 2:
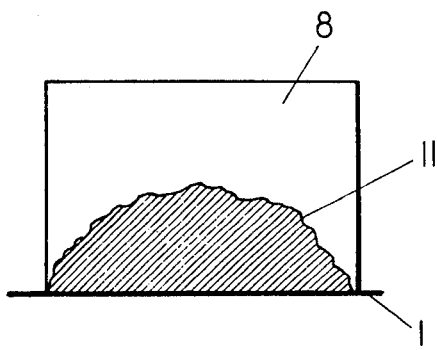

By way of example only, one embodiment of the present invention will be described with reference to the accompanying drawings in which:

FIG. 1 is a diagrammatic side view of apparatus constructed in accordance with the present invention, the apparatus being shown in an operable position; and FIG. 2 which shows a diagrammatic sectional view through a detail of FIG. 1.

Referring to the drawings, a part of a belt conveyor 1 is shown loaded with a flow of particulate material 3, for example, run-of-mine coal. The drawing shows the conveyor discharge with the direction of material travel abruptly changing from its normal horizontal conveying direction towards a downward vertical direction.

A light beam source 6 is arranged over the conveyor belt so as to direct a light beam 7 via a transluscent screen 8 towards the flow of particulate material currently being discharged from the belt conveyor. The lower portion of the light beam 7 is interrupted by the falling material as it changes its direction of travel so that the material casts a shadow profile 11 (see FIG. 2) which varies directly depending upon the cross sectional area of the particulate material.

The continuously varying shadow profile is sensed by a sensor including a television camera 12 which has its field of vision reduced to within the zone indicated by broken lines 13 and which clearly sees the shadow profile 11 against the translucent screen. The sensor derives a signal indicative of the sensed shadow profile and feeds the derived signal to a monitor, for example, a computer 16, which considers the derived signal and the particulate material flow velocity to determine the appropriate volume of material conveyed in a unit of time.

In other embodiments of the invention the television camera is replaced by a photo-diode array.

From the above description it will be appreciated that the present invention provides a relatively simple method and apparatus for measuring the approximate volume of particulate material on a conveyor belt, the accuracy of the measured volume being acceptable for many operational installations where the volume of relatively large amounts of particulate material requires to be known.

In addition the present invention would lend itself to use in conjunction with belt weighting equipment 18 to give bulk density measurements. This is important when handling particulate materials such as run-of-mine coal when bulk density measurements are used to give an indication of the ash content or quality of the coal.

A (contrasting coloured) screen could replace the translucent screen such that the camera or monitor receives a beam of reflected ambient light which is interrupted by the material.

We claim:

1. A method of measuring volume of flow of particulate material, comprising abruptly changing the direction of flow of material, directing a beam of light towards the material currently changing its direction of flow so that a portion of the beam of light is interrupted by the material currently changing direction of flow, sensing the shadow profile of the material interrupting the beam of light, deriving a signal indicative of the shadow profile, and monitoring the derived signal to determine volume of flow.

2. A method as claimed in claim 1, wherein the material changes its direction of flow as it is discharged from a conveyor.

3. A method as claimed in claim 1 wherein the directing a beam of light towards the material comprises directing a beam of light to a translucent screen and directing light from the screen toward the material.

4. A method as claimed in claim 1 wherein the sensing comprises continuously sensing the shadow profile of the material currently changing its direction of flow and continuously deriving a signal indicative of the shadow profile.

5. Apparatus for carrying out the method for measuring volume of flow of particulate material comprising a light beam source for directing a light beam towards the flow of particulate material as it abruptly changes direction such that a portion of the light beam is interrupted by the flow of material, a sensor for sensing the shadow profile formed by the material currently interrupting the light beam and for deriving a signal indicative of the shadow profile, and a monitor for receiving the derived signal to determine the volume of flow.

6. Apparatus as claimed in claim 5, comprising a translucent screen provided between the source and the particulate material.

7. Apparatus as claimed in claim 6, wherein the sensor includes a television camera.

8. Apparatus as claimed in claim 5, wherein the sensor includes a photo-diode array.

9. Apparatus as claimed in claim 5, wherein the monitor comprises a computer.

10. Apparatus as claimed in claim 5, in combination with equipment for weighting the flowing particulate material.

* * * * *